United States Patent [19]
Lind

[11]  4,240,164
[45]  Dec. 23, 1980

[54] DEVICE IN A TOILET FOR BIOLOGICAL DEGRADATION OF EXCREMENT
[75] Inventor: John H. Lind, Solna, Sweden
[73] Assignee: Polypur Forsaljnings AB, Sundbyberg, Sweden
[21] Appl. No.: 953,369
[22] Filed: Oct. 23, 1978
[30] Foreign Application Priority Data Oct. 28, 1977 [SE] Sweden .............................. 77/12193

[51] Int. Cl.³ ........................ A47K 11/02; B01F 7/02; C05F 3/04
[52] U.S. Cl. .......................................... 4/449; 4/319; 4/DIG. 12; 366/196; 366/343; 422/225
[58] Field of Search ................... 4/111, DIG. 12, 317, 4/319, 320, 321, 115, 300, DIG. 19, 144.1; 366/279, 320, 343, 196; 210/178, 179; 422/225, 229, 109, 184; 71/8-10

[56] References Cited
U.S. PATENT DOCUMENTS

| 776,971 | 12/1904 | Morgan | 366/343 |
|---|---|---|---|
| 842,509 | 1/1907 | Woodruff | 366/343 |
| 2,240,237 | 4/1941 | Anderson | 366/343 X |
| 3,063,813 | 11/1962 | Weinbrenner et al. | 366/320 |
| 3,859,672 | 1/1975 | Modig | 4/111 |
| 3,921,228 | 11/1975 | Sundberg | 4/DIG. 12 |
| 4,121,779 | 10/1978 | Mills | 366/279 |

FOREIGN PATENT DOCUMENTS

| 2253737 | 5/1973 | Fed. Rep. of Germany | 4/DIG. 12 |
|---|---|---|---|
| 2458620 | 6/1976 | Fed. Rep. of Germany | 4/DIG. 12 |

Primary Examiner—Stuart S. Levy
Attorney, Agent, or Firm—Christel, Bean & Linihan

[57] ABSTRACT

A toilet for biological degradation of excrement comprises a collecting vessel for excrement and for material suitable for the degradation thereof and a container for receiving a mixture of excrement and material discharged from the collecting vessel. The mixing and the discharge of the excrement and material are performed by a cultivator rotationally supported in the collecting vessel. The cultivator consists of a wire construction running continuously between two opposed walls of the collecting vessel and preferably being manufactured in one single piece.

6 Claims, 5 Drawing Figures

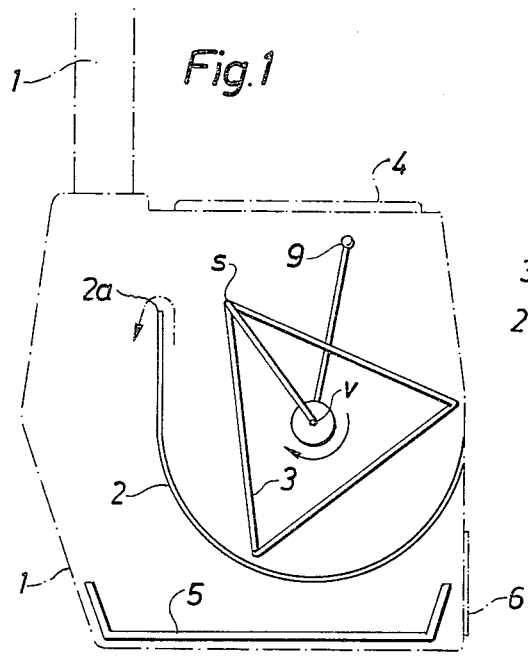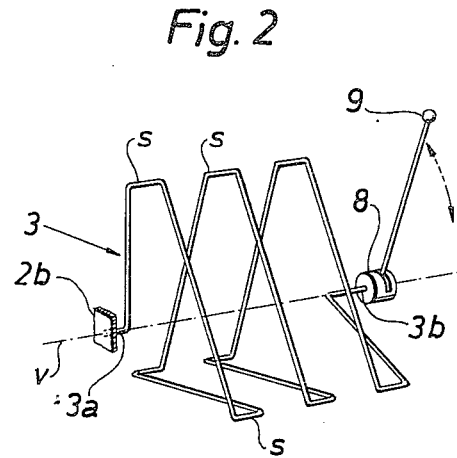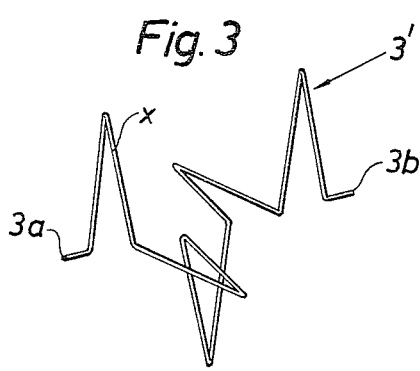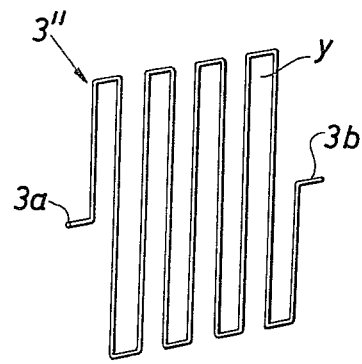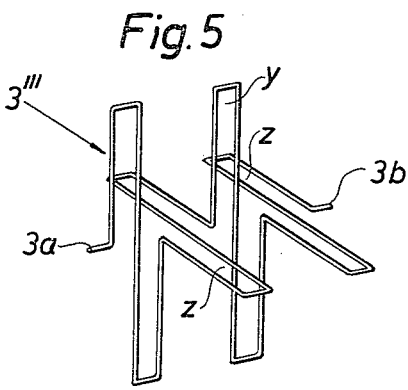

DEVICE IN A TOILET FOR BIOLOGICAL DEGRADATION OF EXCREMENT

The present invention relates to a device in a toilet for biological degradation of excrement.

Such toilets are previously known. They include a collecting vessel for excrement and for material suitable for degradation of excrement. A container located near the collecting vessel receives excrement after the excrement has been mixed with said material and degraded. The mixing is performed by a cultivator arranged in the collecting vessel.

In Swedish Pat. No. 7212051-2 there is shown a cultivator consisting of a shaft rotatably and horizontally supported by the walls of the collecting vessel. The shaft is provided with a number of fingers extending radially therefrom. It is true that such a cultivator functions satisfactorily as regards the mixing of excrement and material but it cannot move the mixture. Such a movement is not necessary when the cultivator is arranged in a collecting vessel from which the mixture is discharged through its bottom, but if the discharge is performed via the upper edge of the vessel, which is to prefer for different reasons, it is a condition that the mixture in the collecting vessel is moved in a certain definite direction in order that the discharge shall be limited to a part of the upper edge of the vessel. Moreover, the known cultivator is relatively expensive to manufacture because a number of fingers have to be welded to or in any other way connected to the shaft. Further, it is laborious to mount since its shaft is stiff and the ends thereof with difficulty can be introduced in bearing holes in the walls of the collecting vessel.

It is an object of the present invention to abolish the disadvantages of previously known devices of the above described kind and to provide a cultivator which is simple and easy to manufacture and mount. Moreover, it produces a perfect mixture of excrement and material and moves the mixture in the desired direction in order to discharge it to the container from which the mixture may be removed in mould form.

This object is achieved by giving the invention the characteristics described in the claims.

Preferred embodiments of the invention will now be described in conjunction with the enclosed drawing on which FIG. 1 is a schematic side view, partly in section, of a toilet including the device according to the invention, FIG. 2 is a perspective view of the cultivator used in the device according to FIG. 1, and FIGS. 3-5 are perspective views of further embodiments of the cultivator used in the device according to the invention.

The toilet schematically shown with dash-dotted lines in FIG. 1 comprises an outer casing 1 in which is mounted a collecting vessel 2 having a bottom, which is semi-circular in cross section, and end walls connected thereto. One of the end walls is indicated at 2b in FIG. 2. At the right portion of the vessel 2 shown in FIG. 1 and at the end walls thereof the upper horizontal edges of the vessel are connected to the casing 1 so that excrement, etc. cannot fall down between the casing and the vessel. In the left portion of the vessel 2 shown in FIG. 1 the upper horizontal edge 2a is located at a higher level than an axis of rotation v for a cultivator 3 extending between and rotatably supported in the end walls of the vessel in a manner to be described further below.

The upper part of the casing 1 is provided with an opening in which is mounted a toilet seat 4. In its lower part the casing contains a container 5 to which the cultivator 3 discharges a mixture of biologically degraded excrement and material used for the degradation. The container 5 may be removed from the casing 1 through an opening 6 therein to empty its contents when necessary. A ventilating pipe 7 with a fan (not shown) built-in is connected to the casing 1 and removes evil-smelling gases from the interior of the toilet.

As has been mentioned above the cultivator 3 is rotatably supported in and extends between the end walls of the collecting vessel 2. The task of the cultivator 3 is to mix a material, which has been introduced in the vessel 2 and which is suitable for degradation of excrement fallen down into the vessel, with said excrement and also to discharge this mixture over the edge 2a of the vessel 2 so that the mixture (the compost) falls down into the container 5.

In the Figures, different embodiments of the cultivator 3 are shown. In all embodiments the cultivator consists of a wire construction which extends between the end walls of the vessel 2 and runs continuously perpendicular to the rotational plane of the cultivator. Both ends 3a and 3b of the wire construction are inserted into bearing holes in the end walls. Because the construction to a certain extent is flexible perpendicularly to its rotational plane the cultivator 3 may be somewhat compressed during the mounting thereof and the ends 3a and 3b brought in alignment with the holes in the end walls. Thereafter, the construction is allowed to expand so that the ends 3a and 3b are introduced into the holes in the end walls. One, 3b, of the wire ends is longer than the other wire end 3a and extends through a hole in the casing 1. The end 3b is connected to a pawl-and-ratchet coupling 8 which co-operates with a swingable bar 9. When the bar 9 is swung in one direction the cultivator 3 will be rotated clockwise in FIG. 1 a predetermined angle via the coupling 8. Swinging of the bar 9 in the other direction is prevented by the coupling 8. Instead of a bar and a pawl-and-ratchet coupling an electric motor may be connected to the shaft end 3b in a suitable manner in order to rotate the cultivator a predetermined angle. The rotation of the cultivator 3 preferably should be performed after each time the toilet has been used.

The portions s of the cultivator 3 located nearest the bottom of the collecting vessel 2 are spaced one or a few centimeters from the bottom and are preferably perpendicular to the rotational plane of the cultivator in order to increase the mixing and discharging effect of the cultivator in this area.

As has been mentioned above the cultivator 3 consists of a wire construction which runs continuously from one end wall to the other of the collecting vessel 2. The wire construction may have any of a great number of forms, which will be described below, and preferably it is manufactured from one single coarse and acidproof steel wire which has been bent or otherwise deformed to the desired form. Instead, other materials may be used, for instance flat iron, tubes or the like, provided that these can be bent or deformed to the desired form.

The cultivator 3 shown in FIGS. 1 and 2 may be said to consist of a helix which has been deformed in directions parallel to the rotational plane of the cultivator, in order to get a triangular form (FIG. 1) seen in the direction of the imaginary axis of rotation v extending through the shaft ends 3a and 3b, and also in directions parallel to the axis v in order to get a zigzag form seen in a direction perpendicular to the axis v. The portions s which extend parallel to the axis v are the above mentioned portions that increase the mixing and discharging effect. The number of portions s and "triangles" and the distances therebetween are determined by the size of the vessel 2 and the desired mixing and discharging effect.

In FIG. 3 the wire construction 3' consists of a number of V-formed legs extending from the imaginary axis v and connected to each other so that adjacent legs will be perpendicular to each other in planes parallel to the rotational plane.

In FIG. 4 the wire construction 3" has a zigzag form with all the portions (U-formed legs y) located in one single plane parallel to the imaginary axis v. In FIG. 5 the wire construction 3''' resembles that of FIG. 4 but with the difference that some U-formed legs (z) have been bent out in right angle to the legs y located in said plane.

Even if a number of embodiments of the invention has been described above it should be understood that the invention is not limited to these embodiments but may be modified within that which is stated in the claims.

I claim:

1. Device in toilets for biological degradation of excrement, the device comprising a collecting vessel for excrement and for material suitable for the degradation thereof and a container for receiving a mixture of excrement and material discharged from the collecting vessel, said collecting vessel having a solid bottom portion and an upper edge above said bottom portion, said mixture being moved from the interior of said vessel over said upper edge to the exterior of said vessel when discharged from said vessel, said container having an opening located outwardly of and below said vessel upper edge to receive said discharged mixture, the mixing being performed by a cultivator rotationally supported in the collecting vessel, said cultivator comprising a wire construction running continuously between and rotationally supported by two opposed side walls of the collecting vessel and having an axis of rotation generally lengthwise of said vessel upper edge for mixing material and excrement and discharging the mixture to the container via said upper edge of the collecting vessel, said cultivator having portions spaced axially therealong and extending radially outwardly from said axis, said portions being disposed in planes substantially perpendicular to a plane disposed perpendicular to said axis of rotation.

2. Device according to claim 1, wherein the wire construction is manufactured in one piece.

3. Device according to claim 1 or 2, wherein the wire construction, at a distance from an imaginary rotational axis therethrough, comprises portions forming an angle different from right angle with said axis.

4. Device according to claim 1, wherein the wire construction is in the form of a deformed helix.

5. Device according to claim 1, wherein the wire construction is zigzag-formed in one single piece.

6. Device according to claim 1, wherein said portions extend radially outwardly from said axis of rotation a distance sufficient to be located close to said vessel bottom portion as said cultivator rotates.

* * * * *